US011703911B2

(12) United States Patent
Mochizuki et al.

(10) Patent No.: US 11,703,911 B2
(45) Date of Patent: *Jul. 18, 2023

(54) PORTABLE TERMINAL

(71) Applicant: PANASONIC INTELLECTUAL PROPERTY MANAGEMENT CO., LTD., Osaka (JP)

(72) Inventors: Kenichi Mochizuki, Kanagawa (JP); Atsuhiro Koyama, Tokyo (JP); Takayuki Konishi, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/564,515

(22) Filed: Dec. 29, 2021

(65) Prior Publication Data

US 2022/0121242 A1    Apr. 21, 2022

Related U.S. Application Data

(63) Continuation of application No. PCT/JP2021/006499, filed on Feb. 19, 2021.

(30) Foreign Application Priority Data

Apr. 24, 2020    (JP) ................. 2020-077785

(51) Int. Cl.
*G06F 1/16*    (2006.01)
(52) U.S. Cl.
CPC .......... *G06F 1/1635* (2013.01); *G06F 1/1626* (2013.01); *G06F 1/1632* (2013.01)

(58) Field of Classification Search
CPC ..... G06F 1/1626; G06F 1/1632; G06F 1/1635
See application file for complete search history.

(56) References Cited

U.S. PATENT DOCUMENTS 9,004,549 B2 *  4/2015  Lee ..................... E05B 17/2019
                                                          292/145
9,110,633 B2 *  8/2015  Yuan .................... G06F 1/1656
(Continued)

FOREIGN PATENT DOCUMENTS

JP    2004-013843 A    1/2004
JP    2013-254593 A    12/2013
(Continued)

OTHER PUBLICATIONS

International Search Report issued in International Bureau of WIPO Patent Application No. PCT/JP2021/006499, dated Jun. 4, 2021, along with an English translation thereof.
(Continued)

*Primary Examiner* — Adrian S Wilson
(74) *Attorney, Agent, or Firm* — Greenblum & Bernstein, P.L.C.

(57) ABSTRACT

A portable terminal includes a main body having a rectangular shape in a plan view and having a display on a surface, a battery housed in the main body, and a circuit board. As viewed from the back, the main body is divided into areas consisting of a matrix of 25 divisions. The battery is housed in a first integrated area, and the center of the battery is located in the 13th area as viewed from the back. The circuit board is disposed along the perimeter of the battery as viewed through the back, and an option component is removably attached to an option area.

7 Claims, 15 Drawing Sheets

(56) References Cited

U.S. PATENT DOCUMENTS

| | | | |
|---|---|---|---|
| 9,317,066 B2* | 4/2016 | Mochizuki | G06F 1/1635 |
| 11,448,333 B2* | 9/2022 | Kondo | F16K 37/0041 |
| 2003/0227443 A1 | 12/2003 | Kyouzuka et al. | |
| 2012/0319414 A1 | 12/2012 | Potter et al. | |
| 2013/0093197 A1* | 4/2013 | Lee | E05C 1/04 |
| | | | 292/145 |
| 2013/0285398 A1 | 10/2013 | Potter et al. | |
| 2014/0159405 A1 | 6/2014 | Potter et al. | |
| 2014/0226292 A1* | 8/2014 | Mochizuki | G06F 1/1658 |
| | | | 361/752 |
| 2014/0232607 A1 | 8/2014 | Lee et al. | |
| 2015/0272307 A1 | 10/2015 | Potter et al. | |
| 2019/0222683 A1 | 7/2019 | Choi et al. | |
| 2019/0332836 A1* | 10/2019 | Mochizuki | G06F 1/1686 |

FOREIGN PATENT DOCUMENTS

| | | |
|---|---|---|
| JP | 2014-517942 A | 7/2014 |
| JP | 2014-192560 A | 10/2014 |
| JP | 2016/048427 A | 4/2016 |
| JP | 2019-125371 A | 7/2019 |

OTHER PUBLICATIONS

Written Opinion of the International Searching Authority issued in International Bureau of WIPO Patent Application No. PCT/JP2021/006499, dated Jun. 4, 2021.

* cited by examiner

PORTABLE TERMINAL

CROSS-REFERENCE TO RELATED APPLICATIONS

This is a continuation of International Application No. PCT/JP2021/006499 filed on Feb. 19, 2021, and claims priority from Japanese Patent Application No. 2020-077785 filed on Apr. 24, 2020, the entire content of which is incorporated herein by reference.

TECHNICAL FIELD

The present disclosure relates to a portable terminal.

BACKGROUND ART

In the related art, there has been known a tablet PC in which a battery is disposed on one side of a rectangular main body (see JP-A-2004-13843). In the tablet PC, the battery is disposed at an end portion so as to at least partially overlap an upper cover.

SUMMARY OF INVENTION

However, when the tablet PC of the related art is held in a vertical orientation and a horizontal orientation, since the battery is disposed at the end portion, a center of gravity may shift to a side that is not held, and a burden may be applied to a user when the user holds the tablet PC for a long period of time. In addition, when the tablet PC of the related art is held in the vertical orientation (portrait orientation) and the horizontal orientation (landscape orientation), an operation portion may be hidden by the hand holding the tablet PC.

The present disclosure has been made in view of the above-described situation in the related art, and an object of the present disclosure is to provide a portable terminal that can reduce a burden applied when a user holds the portable terminal even when the portable terminal is held in any of a vertical orientation and a horizontal orientation, and can suppress a decrease in operability of the portable terminal.

According to an aspect of the present disclosure, there is provided a portable terminal including a main body having a rectangular shape in a plan view and having a display on a surface thereof, a battery accommodated in the main body, and a circuit board. In a state where two short edges among four edges of a back surface of the main body are positioned on a left side and a right side of the main body, when viewed from the back surface, the main body is divided into matrix regions, which are regions of a matrix of 25 divisions, by an imaginary line dividing each of two edges of the main body orthogonal to each other into five equal parts. In a state where any of the two edges is defined as an upper edge disposed on an upper side, five regions containing the upper edge are defined as a first region, a second region, a third region, a fourth region, and a fifth region S5 in order from the left side. Five regions below the first region, the second region, the third region, the fourth region, and the fifth region are defined as a sixth region, a seventh region, an eighth region, a ninth region, and a tenth region in order from the left side. Five regions below the sixth region, the seventh region, the eighth region, the ninth region, and the tenth region are defined as an eleventh region, a twelfth region, a thirteenth region, a fourteenth region, and a fifteenth region in order from the left side. Five regions below the eleventh region, the twelfth region, the thirteenth region, the fourteenth region, and the fifteenth region are defined as a sixteenth region, a seventeenth region, an eighteenth region, a nineteenth region, and a twentieth region in order from the left side. Five regions below the sixteenth region, the seventeenth region, the eighteenth region, the nineteenth region, and the twentieth region are defined as a twenty-first region, a twenty-second region, a twenty-third region, a twenty-fourth region, and a twenty-fifth region in order from the left side. The battery is accommodated in a first merged region in which the seventh region to the ninth region, the twelfth region to the fourteenth region, and the seventeenth region to the nineteenth region are merged, area of a front surface of the battery in a plan view is equal to or less than 9/25 of area of a back surface of the portable terminal in a plan view, and a length of a side surface of the battery is equal to or less than 3/5 of a length of a side surface of the portable terminal. When the portable terminal is viewed from the back surface, a center of the battery is in the thirteenth region. The circuit board is disposed along a periphery of the battery when the portable terminal is seen through the back surface. An optional area is provided in any of a third merged region, in which the second region to the fourth region are merged, and a fourth merged region, in which the tenth region, the fifteenth region, and the twentieth region are merged, and an optional component is detachably attached to the optional area.

According to the present disclosure, even when a portable terminal is held in any of a vertical orientation and a horizontal orientation, a burden applied to a user when the user holds the portable terminal can be reduced, and a decrease in operability of the portable terminal can be suppressed.

DESCRIPTION OF EMBODIMENTS

Hereinafter, embodiments in which a portable terminal according to the present disclosure is specifically disclosed will be described in detail with reference to the drawings as appropriate. An unnecessarily detailed description may be omitted. For example, a detailed description of a well-known matter or a repeated description of substantially the same configuration may be omitted. This is to avoid unnecessary redundancy of the following description and to facilitate understanding of those skilled in the art. Note that the accompanying drawings and the following description are provided for those skilled in the art to sufficiently understand the present disclosure, and are not intended to limit the subject matter recited in the claims.

Figure 1:
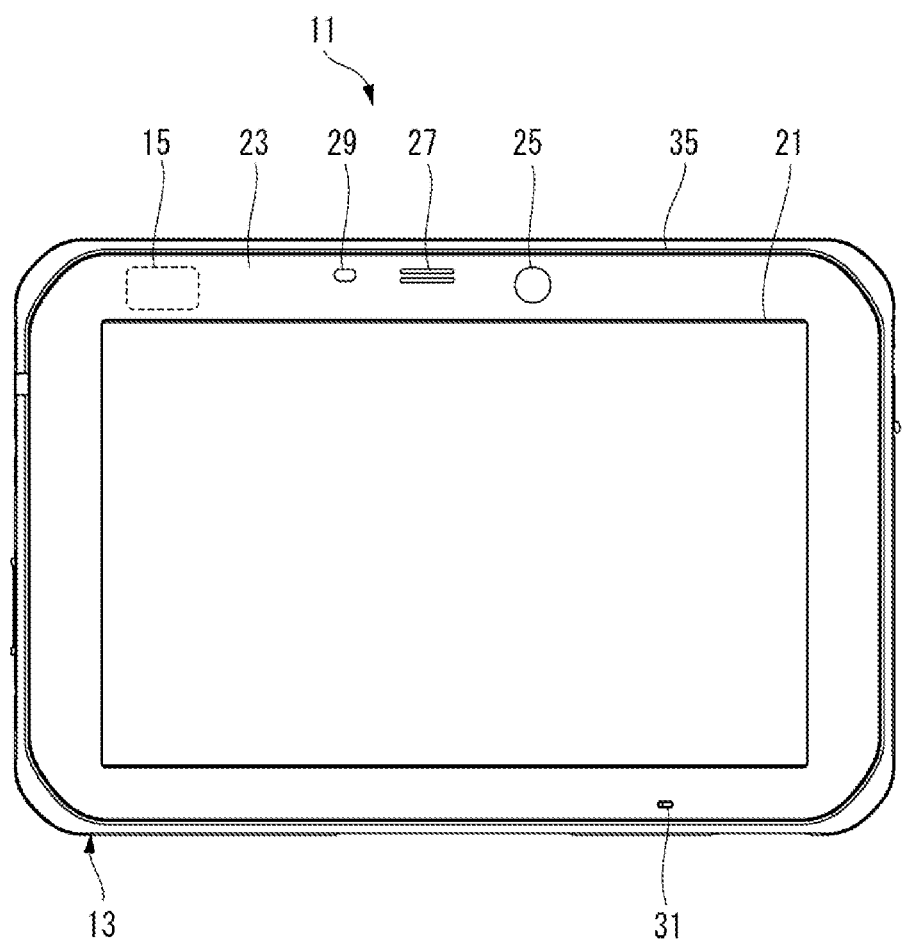
FIG. 1 is a front view of a portable terminal according to a first embodiment of the present disclosure.

FIG. 1 is a front view of a portable terminal 11 according to a first embodiment of the present disclosure.

The portable terminal 11 is an electronic device such as a portable telephone including a smartphone, a tablet, a digital camera, a portable personal computer, a wireless device, or a settlement terminal, and is for personal use and business use. The portable terminal 11 of the present embodiment is an example of a tablet type portable terminal that features impact resistance, vibration resistance, drip proofness, dust proofness, and the like, and is used in a commercial scenario such as a factory, construction, public safety, and a transport company.

The portable terminal 11 according to the first embodiment mainly includes a main body 13, a camera (rear camera 15), a battery 17 (see FIG. 2), and an operation button 19.

The main body 13 has a quadrangular shape in a plan view. More specifically, in the first embodiment, the main body 13 is formed in a substantially quadrangular plate shape in a plan view. The main body 13 is provided with a display 21 that includes a liquid crystal panel, a touch panel, and the like, in a front surface thereof. The display 21 is disposed in a central portion of the front surface of the main body 13. The display 21 displays an image or a video by radiating light from an information display area provided in a direction in which the touch panel is provided.

In the front surface of the main body 13, a periphery of the display 21 is a frame portion (bezel portion 23) that is a non-display region of video. In the bezel portion 23, for example, a front camera 25, a speaker 27, an illuminance sensor 29, and the like are disposed in an upper bezel portion in a case where one long edge is set as an upper edge, and a front microphone 31 and the like are positioned in a lower bezel portion. In addition, various LED indicators may be arranged in the bezel portion 23.

Figure 2:
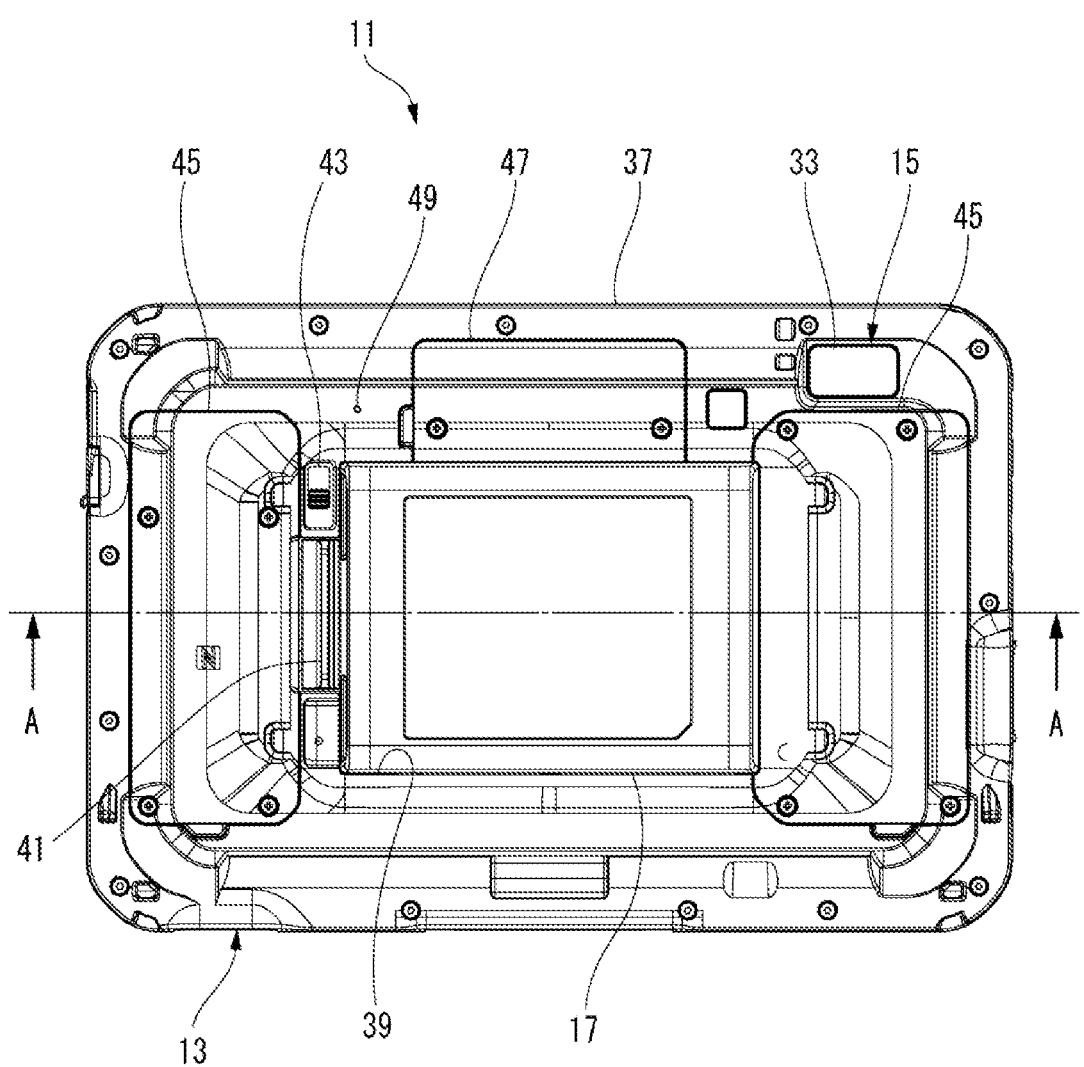
FIG. 2 is a back view of the portable terminal illustrated in FIG. 1.

FIG. 2 is a rear view of the portable terminal 11 illustrated in FIG. 1.

The camera (rear camera 15) is provided in a back surface opposite to the front surface of the main body 13. The rear camera 15 is covered with a cover glass 33 having a rectangular shape. The cover glass 33 covers a lens of the rear camera 15, an illumination light source (flash), and the like. The main body 13 is formed by combining two parts of a front cover 35 on a front surface side and a rear cover 37 on a back surface side, which are divided in a thickness direction (see FIG. 6). The bezel portion 23 is formed in the front cover 35. The rear camera 15 is disposed in the rear cover 37 and is covered with the cover glass 33. The front cover 35 and the rear cover 37 are made of resin or metal.

The battery 17 is attached from the back surface of the main body 13, that is, from the rear cover 37. The battery 17 is formed in a rectangular shape in a plan view, and is attached by inserting a part thereof in the thickness direction into a battery attachment opening 39 formed in the rear cover 37. The rear cover 37 is provided with a locking releasing protrusion 41 and a locking lock-button 43 along one short edge of the battery 17.

In the portable terminal 11, a pair of protruding portions 45 extending along a pair of parallel short edges of the battery 17 are detachably provided on the back surface of the main body 13. In the portable terminal 11, a wireless system is accommodated on a left side as viewed from the back surface, and a right side and an upper side thereof are optional areas. The optional area can be connected to a card reader or the like. An upper lid portion 47 and the pair of protruding portions 45 provided on the rear cover 37 are attached such that functional components thereof and the optional areas can be freely exposed. In the rear cover 37, a rear microphone 49 is provided beside the upper lid portion 47. Note that the card reader may include a bar code reader, a magnetic card reader, a contact IC card reader, a non-contact IC card reader/writer, and the like.

Figure 3:
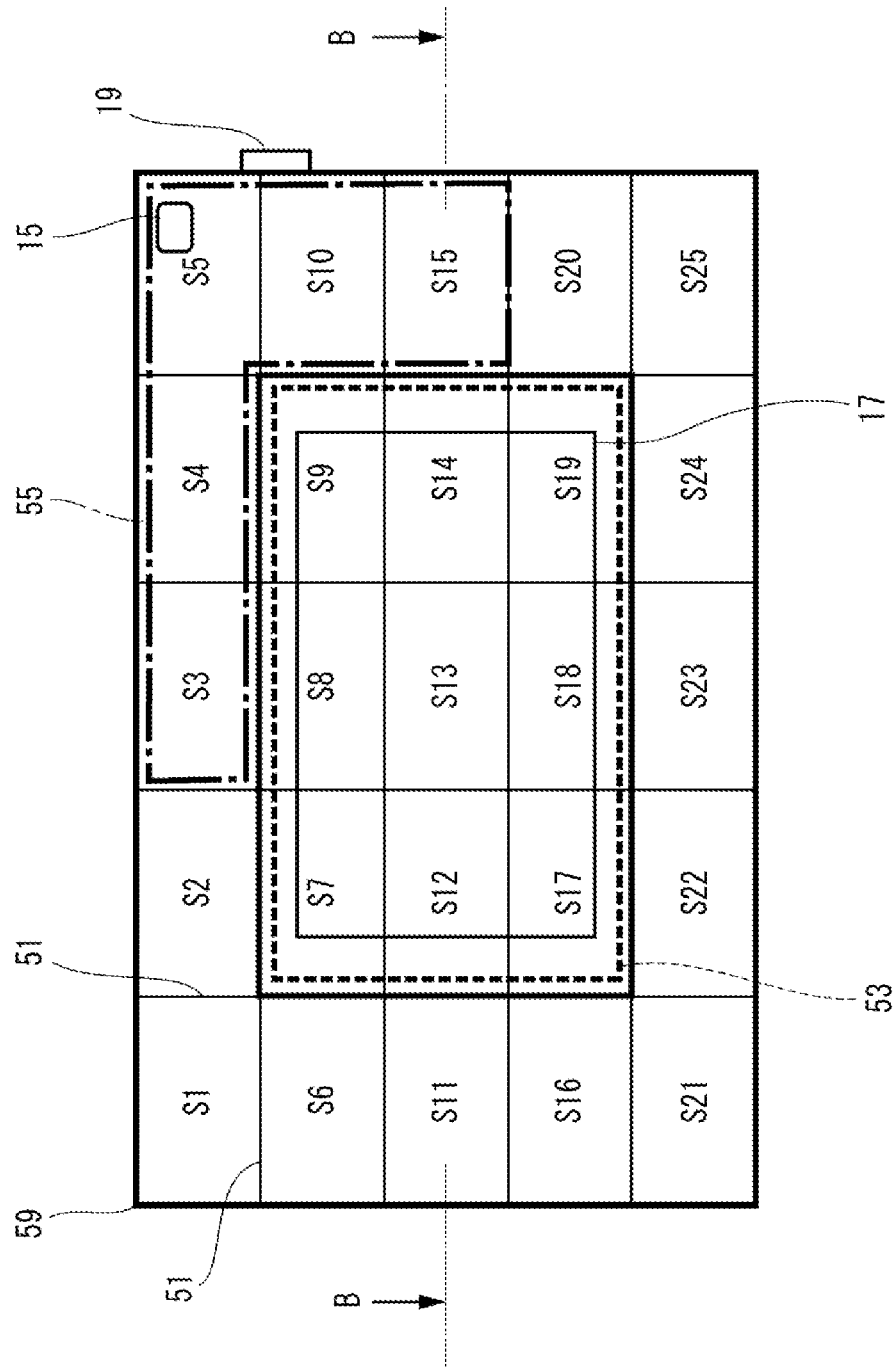
FIG. 3 is a schematic diagram illustrating an example in which a back surface of a main body is divided into regions of a matrix of 25 divisions.

FIG. 3 is a schematic diagram illustrating an example in which the back surface of the main body 13 is divided into regions of a matrix of 25 divisions.

The main body 13 is divided into regions of a matrix of 25 divisions when viewed from the back surface by imaginary lines 51 dividing each of two edges, which are orthogonal to each other, into five equal parts.

In the portable terminal 11 of the first embodiment, the main body 13 has a rectangular shape in a plan view, and matrix regions are defined from a first region S1 to a twenty-fifth region S25 in a state where two short edges of four edges of the back surface are positioned on the left and right of the main body 13.

More specifically, in a state where any of the two edges of the main body 13, which are orthogonal to each other, is defined as an upper edge disposed on the upper side, five regions containing the upper edge are defined as the first region S1, a second region S2, a third region S3, a fourth region S4, and a fifth region S5 in order from the left. Five regions below the first region S1, the second region S2, the third region S3, the fourth region S4, and the fifth region S5 are defined as a sixth region S6, a seventh region S7, an eighth region S8, a ninth region S9, and a tenth region S10 in order from the left. Five regions below the sixth region S6, the seventh region S7, the eighth region S8, the ninth region S9, and the tenth region S10 are defined as an eleventh region S11, a twelfth region S12, a thirteenth region S13, a fourteenth region S14, and a fifteenth region S15 in order from the left. Five regions below the eleventh region S11, the twelfth region S12, the thirteenth region S13, the fourteenth region S14, and the fifteenth region S15 are defined as a sixteenth region S16, a seventeenth region S17, an eighteenth region S18, a nineteenth region S19, and a twentieth region S20 in order from the left. Five regions below the sixteenth region S16, the seventeenth region S17, the eighteenth region S18, the nineteenth region S19, and the twentieth region S20 are defined as a twenty-first region S21, a twenty-second region S22, a twenty-third region S23, a twenty-fourth region S24, and a twenty-fifth region S25 in order from the left.

Among the regions, the rear camera 15 is provided in the fifth region S5, and the battery 17 is accommodated inside a first merged region 53 in which the seventh region S7 to the ninth region S9, the twelfth region S12 to the fourteenth region S14, and the seventeenth region S17 to the nineteenth region S19 are merged. The operation button 19 is provided on an outer surface of the main body 13 at a second merged region 55 in which the third region S3, the fourth region S4, the fifth region S5, the tenth region S10, and the fifteenth region S15 are merged. When the portable terminal 11 is viewed from the back surface, a center of the battery 17 is located inside the thirteenth region S13.

Figure 4:
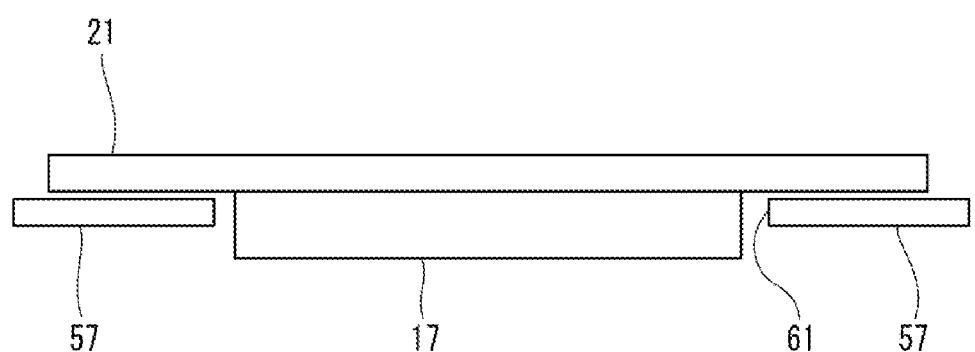
FIG. 4 is a cross-sectional view taken along a line B-B of FIG. 3.

FIG. 4 is a cross-sectional view taken along a line B-B of FIG. 3.

The portable terminal 11 further includes a circuit board 57. The circuit board 57 is disposed along a periphery of the battery 17 when the portable terminal 11 is viewed through the back surface. That is, the circuit board 57 is provided inside a rectangular frame-shaped region 59 (see FIG. 3) in which the first region S1, the second region S2, the third region S3, the fourth region S4, the fifth region S5, the sixth region S6, the tenth region S10, the eleventh region S11, the fifteenth region S15, the sixteenth region S16, the twentieth region S20, the twenty-first region S21, the twenty-second region S22, the twenty-third region S23, the twenty-fourth region S24, and the twenty-fifth region S25 shown in FIG. 3 are merged.

In the portable terminal 11, the circuit board 57 has a hole portion 61, and the battery 17 is inserted into the hole portion 61. Note that the circuit board 57 has a donut shape (a square annular shape) surrounding the entire hole portion 61 by having the hole portion 61, and alternatively may have a shape (for example, a C shape or a U shape) surrounding at least a part of the hole portion 61.

Figure 5:
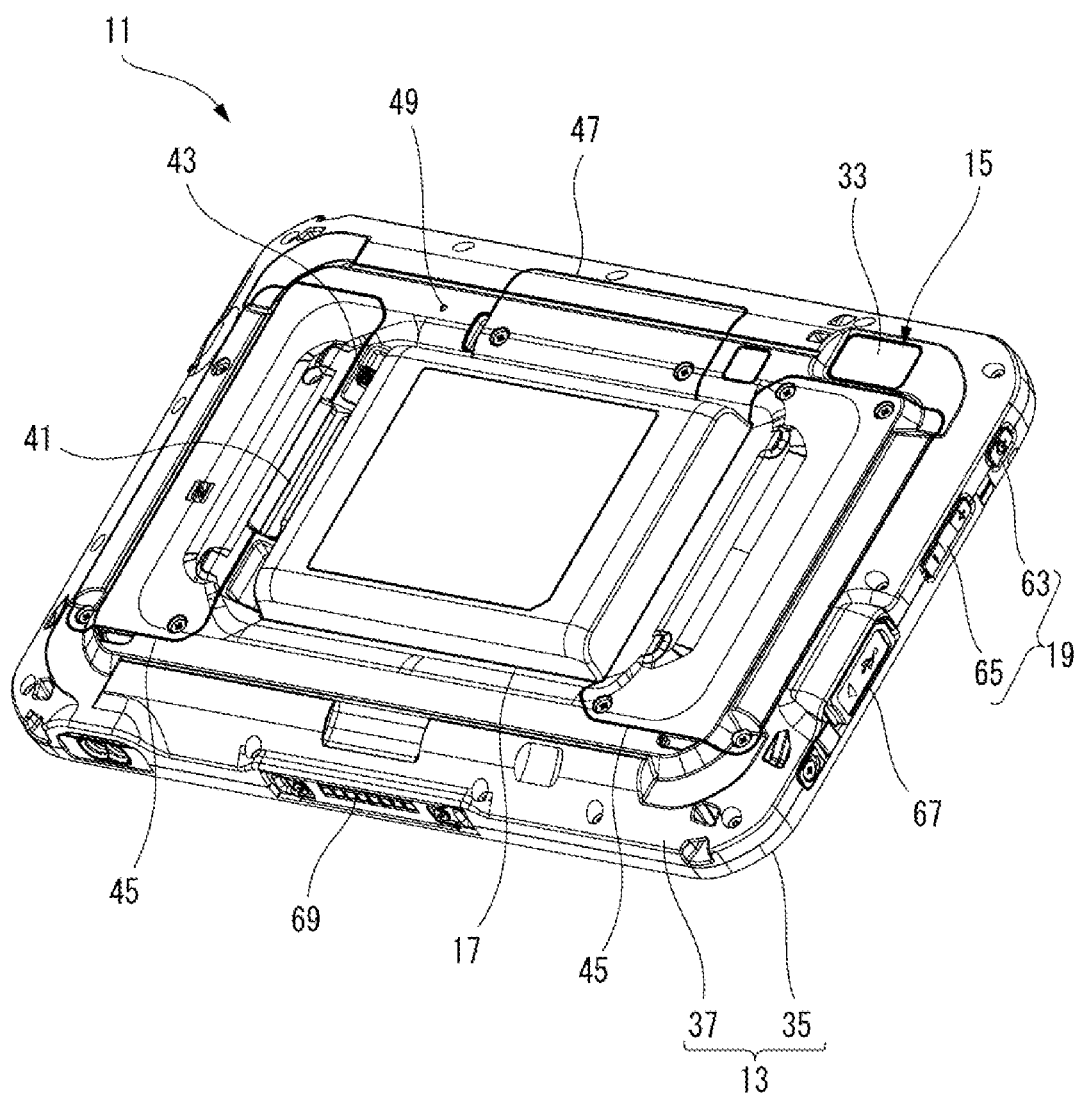
FIG. 5 is a perspective view of the back surface of FIG. 2 as viewed obliquely from above.

FIG. 5 is a perspective view of the back surface of FIG. 2 as viewed obliquely from above.

The operation button 19 is provided on the outer surface of the main body 13, that is, in an opening portion cut across a combination portion of the front cover 35 and the rear cover 37. The operation button 19 includes, for example, a power button 63, a volume button 65, and the like. In addition, on the outer surface of the main body 13, an opening/closing cover 67 for a USB port, an extension bus connector 69 for a docking station, a DC input terminal 71, a headset terminal, and the like are arranged.

Figure 6:
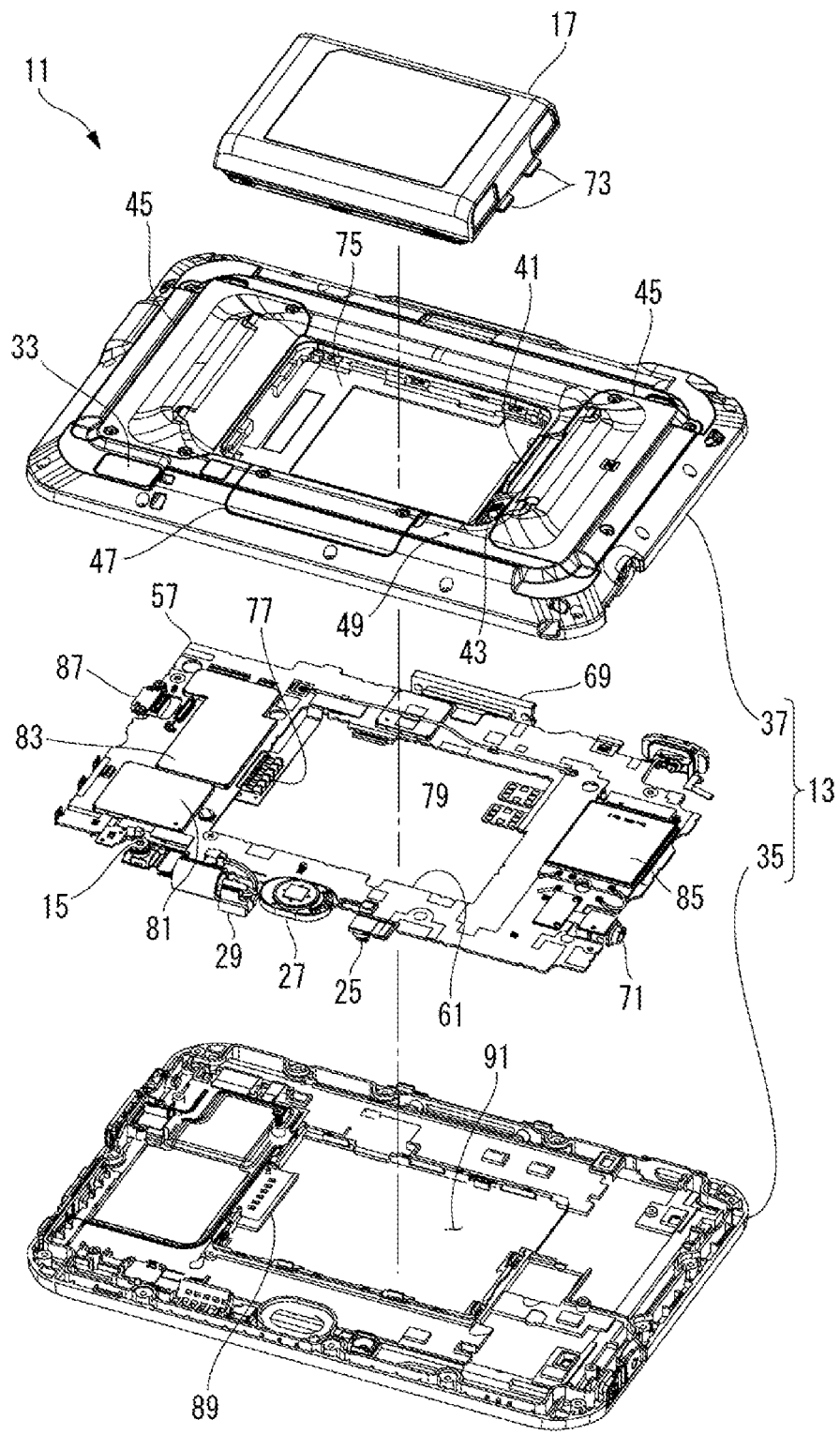
FIG. 6 is an exploded perspective view of main parts obtained by disassembling the portable terminal illustrated in FIG. 5 in an orientation rotated by 180 degrees about an axis perpendicular to the back surface.

FIG. 6 is an exploded perspective view of main parts obtained by disassembling the portable terminal illustrated 11 in FIG. 5 in an orientation rotated by 180 degrees about an axis perpendicular to the back surface.

The battery 17 has a pair of locking claws 73 on the short-edge side, which are spaced apart from each other and protrude. When the locking claw 73 is locked to the rear cover 37, the battery 17 is held to the main body 13 in a state of being placed on a battery placement portion 75 formed in the rear cover 37. When the locking lock-button 43 is released and the locking releasing protrusion 41 is operated, the battery 17 held to the main body 13 can be detached from the main body 13. The circuit board 57 is provided with a terminal portion 77 and a terminal portion 79 for power supply, current detection, and the like, which are electrically in contact with the battery 17 held to the main body 13. On the circuit board 57, an electronic component 81 and an electronic component 83, such as a processor and a power supply IC, are mounted at a portion on a side where the rear camera 15 is provided among two portions sandwiching the hole portion 61. Further, on the circuit board 57, an electronic component 85 (for example, a wireless circuit) of a wireless system is mounted at a portion opposite to the portion on the side where the rear camera 15 is provided among the two portions sandwiching the hole portion 61.

On the circuit board 57, an optional area is secured on an upper-edge side of a side where the upper lid portion 47 is provided, and on a side where the rear camera 15 is provided with the hole portion 61 interposed therebetween, as viewed from the back surface. A card reader or the like can be connected to the optional area. Further, on the circuit board 57, a wireless system arrangement area is secured on the side opposite to the side where the rear camera 15 is provided with the hole portion 61 interposed therebetween, as viewed from the back surface. Further, on the circuit board 57, a connector 87 for the DC input terminal 71 and the like is mounted on a board edge portion on the wireless system arrangement area side. The front cover 35 is provided with a terminal portion 89. The terminal portion 89 connects a power supply circuit or a control circuit, of the display 21 or the touch panel, and the circuit board 57.

Figure 7:
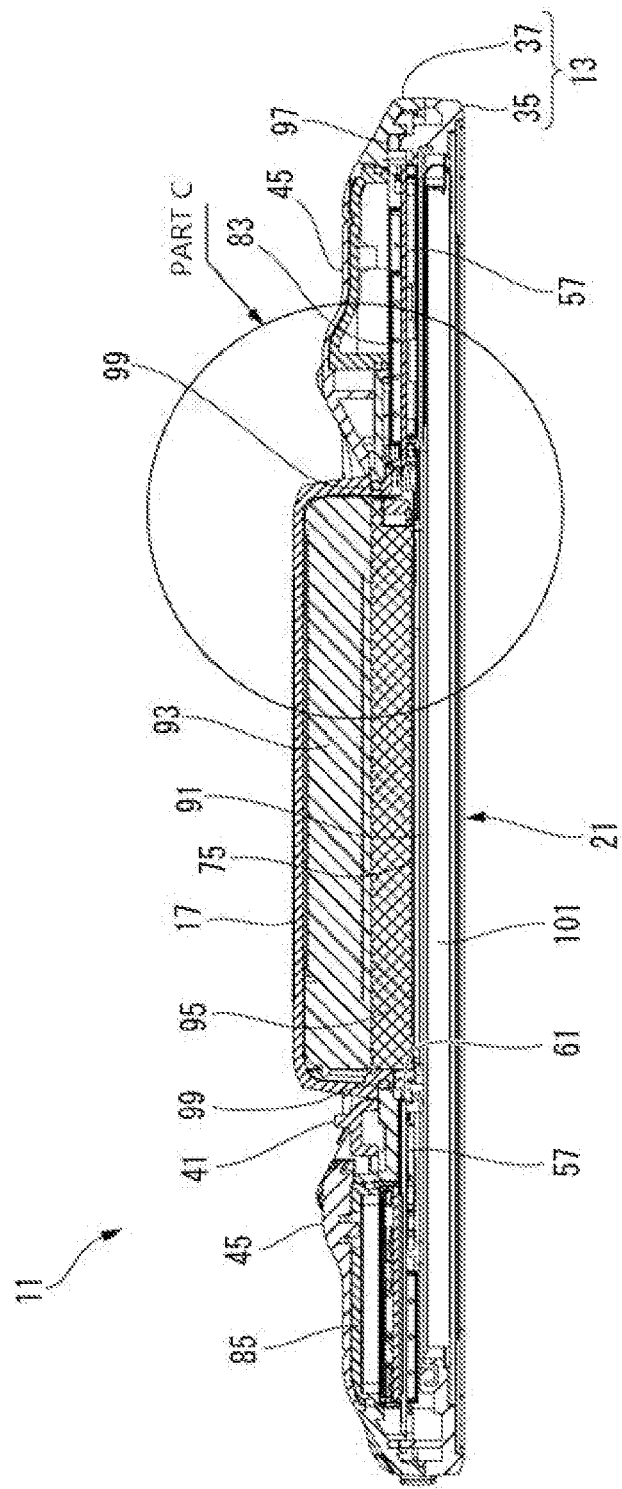
FIG. 7 is a cross-sectional view taken along a line A-A of FIG. 2.

FIG. 7 is a cross-sectional view taken along a line A-A of FIG. 2.

In the portable terminal 11, the battery 17 is attached by being inserted into the hole portion 61. An attachment side surface of the battery 17 is supported on a chassis 91, which is fixed to the front cover 35, via the battery placement portion 75. The chassis 91 is disposed so as to cover a back surface of the display 21 exposed to the hole portion 61. Therefore, when the battery 17 is detached, the chassis 91 is exposed at a bottom of the hole portion 61. Note that the chassis 91 can suppress heat and a voltage of electromagnetic waves.

As the battery 17, a standard type having a thin thickness and a large-capacity type having a thickness larger than that of the standard type are provided. FIG. 7 shows the battery 17 of a large capacity. The battery 17 is provided with a battery circuit portion 95 on an attachment side of a battery main body portion 93. A sealing material 97 is sandwiched at a mating portion of the front cover 35 and the rear cover 37, whereby the mating portion is sealed in a watertight manner.

Figure 8:
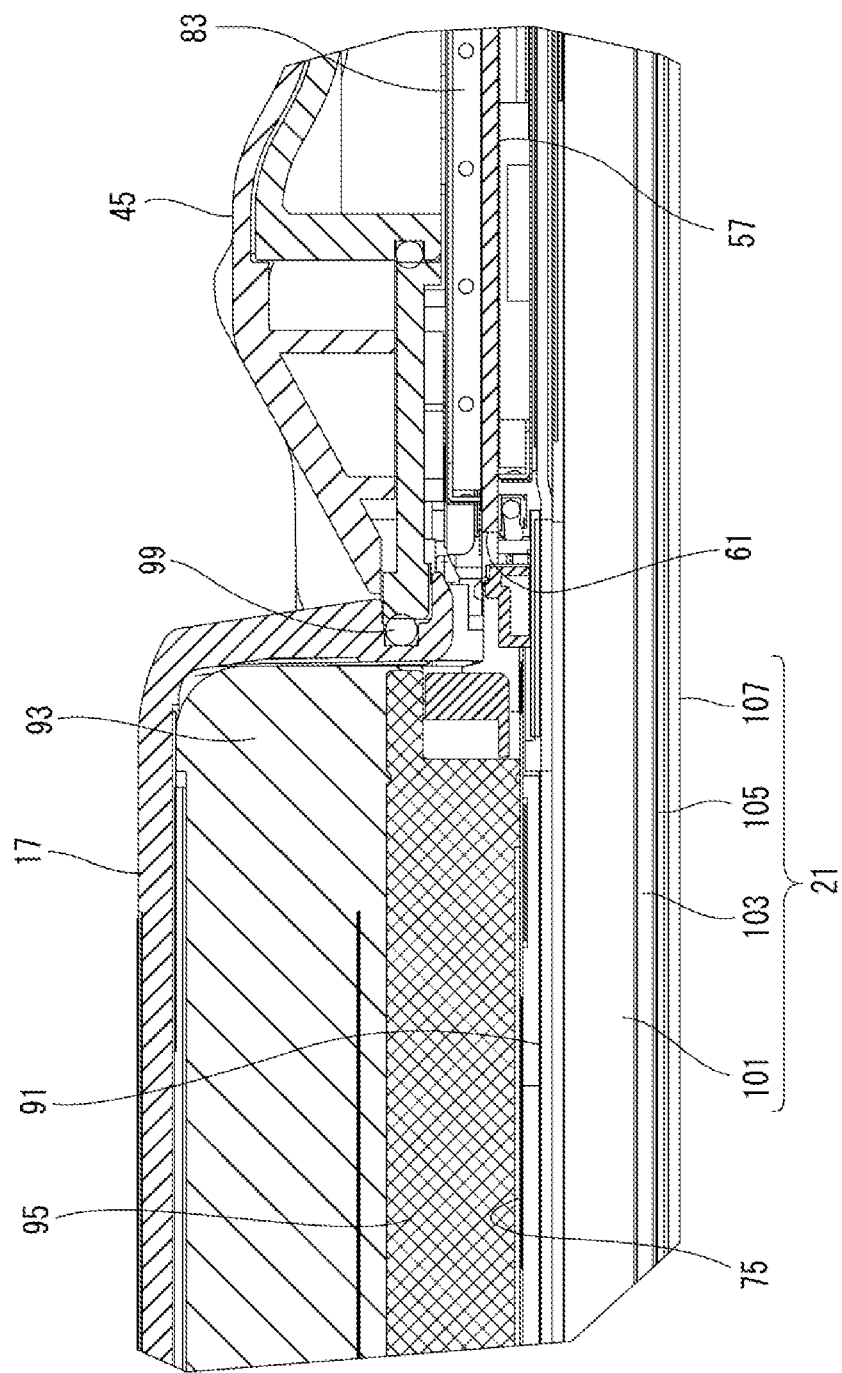
FIG. 8 is an enlarged view of a part C in FIG. 7.

FIG. 8 is an enlarged view of a part C in FIG. 7.

An annular sealing material 99 is externally fitted to an outer periphery of the battery 17 on the attachment side. When the battery 17 is attached to the rear cover 37, the sealing material 99 is brought into close contact with a fitting portion of the rear cover 37, and a space between the battery 17 and the rear cover 37 is sealed in a watertight manner.

The display 21 disposed on a side opposite to the battery 17 with the chassis 91 sandwiched therebetween has a liquid crystal panel 101. A touch panel 103 is adhered to a surface of the liquid crystal panel 101 opposite to the chassis 91. The touch panel 103 detects a change in current at the time of touching, and specifies a touched position based on the amount of change. A front surface side of the touch panel 103 is protected by the cover glass 105. Further, a functional film 107 such as an anti-reflection (AR)/anti-glare (AG) film is adhered to a front surface side of the cover glass 105. The display 21 is configured to include the liquid crystal panel 101, the touch panel 103, the functional film 107, and the like.

Next, an operation of the above-described configuration will be described.

The portable terminal 11 according to the present embodiment has a quadrangular shape in a plan view, and includes the main body 13 having a display 21 in the front surface thereof, the rear camera 15 (an example of a camera) provided in the back surface of the main body 13, the battery 17 accommodated in the main body 13, and the operation button 19 provided on the outer surface of the main body 13. When viewed from the back surface, the main body 13 is divided into the regions of a matrix of 25 divisions by the imaginary lines 51 dividing each of two edges of the main body 13, which are orthogonal to each other, into five equal parts. In a state where any of the two edges is defined as the upper edge arranged on the upper side, the five regions containing the upper edge are defined as the first region S1, the second region S2, the third region S3, the fourth region S4, and the fifth region S5 in order from the left. The five regions below the first region S1, the second region S2, the third region S3, the fourth region S4, and the fifth region S5 are defined as the sixth region S6, the seventh region S7, the eighth region S8, the ninth region S9, and the tenth region S10 in order from the left. The five regions below the sixth region S6, the seventh region S7, the eighth region S8, the ninth region S9, and the tenth region S10 are defined as the eleventh region S11, the twelfth region S12, the thirteenth region S13, the fourteenth region S14, and the fifteenth region S15 in order from the left. The five regions below the eleventh region S11, the twelfth region S12, the thirteenth region S13, the fourteenth region S14, and the fifteenth region S15 are defined as the sixteenth region S16, the seventeenth region S17, the eighteenth region S18, the nineteenth region S19, and the twentieth region S20 in order from the left. The five regions below the sixteenth region S16, the seventeenth region S17, the eighteenth region S18, the nineteenth region S19, and the twentieth region S20 are defined as the twenty-first region S21, the twenty-second region S22, the twenty-third region S23, the twenty-fourth region S24, and the twenty-fifth region S25 in order from the left. The rear camera 15 is provided in the fifth region S5. The battery 17 is accommodated inside the first merged region 53 in which the seventh region S7 to the ninth region S9, the twelfth region S12 to the fourteenth region S14, and the seventeenth region S17 to the nineteenth region S19 are merged. The operation button 19 is provided on the outer surface of the main body 13 at the second merged region 55 in which the third region S3, the fourth region S4, the fifth region S5, the tenth region S10, and the fifteenth region S15 are merged. When the portable terminal 11 is viewed from the back surface, the center of the battery 17 is in the thirteenth region S13.

In the portable terminal 11 according to the present embodiment, the main body 13 is formed in a quadrangular plate shape in a plan view. The portable terminal 11 is generally formed in a rectangular shape in a plan view. Being in a quadrangular shape means that a square shape is not excluded. In the main body 13, the quadrangular display 21 is disposed on the front surface that is one surface of a plate shape. The main body 13 is provided with the rear camera 15 in the back surface opposite to the front surface. The battery 17 is accommodated in the back surface of the main body 13. Further, the operation button 19 is provided on the outer surface of the main body 13. The outer surface may include the front surface, the back surface, or an outer peripheral surface of the main body 13. That is, the operation button 19 may be provided on any of the front surface, the back surface, or the outer peripheral surface of the main body 13. In the first embodiment, the operation button 19 is provided on the outer peripheral surface.

Here, the main body 13 can be considered as being divided into the regions (matrix regions) of a matrix of 25 divisions when viewed from the back surface by the imaginary lines 51 dividing each of two edges, which are orthogonal to each other, into five equal parts. The matrix region can be defined as the first region S1 to the twenty-fifth region S25 in order from the left to the right and from top to bottom.

Further, the seventh region S7 to the ninth region S9, the twelfth region S12 to the fourteenth region S14, and the seventeenth region S17 to the nineteenth region S19 can be defined as the first merged region 53.

The third region S3, the fourth region S4, the fifth region S5, the tenth region S10, and the fifteenth region S15 can be defined as the second merged region 55.

In the portable terminal 11, functional units such as the rear camera 15, the battery 17, the operation button 19, and the like are arranged at specific regions (positions) of the main body 13 that are defined as described above. The rear camera 15 is provided in the fifth region S5. The operation button 19 is provided in the first merged region 53. The regions are in distribution of a case where the main body 13 is viewed from the back surface. At the time of use, the portable terminal 11 is operated while the display 21 on the front surface is being viewed from the front. Therefore, in a state where the display 21 is viewed from the front, the distribution of the matrix regions is horizontally reversed. That is, with respect to the portable terminal 11 held in a state where the display 21 is viewed from the front, for example, the rear camera 15 disposed in the fifth region S5 is located on a back surface side of an upper left portion of the display 21 (see FIG. 1). At this time, when the portable terminal 11 is to be held by the left hand, regions suitable for gripping are the twentieth region S20 and the twenty-fifth region S25 of the main body 13. When the portable terminal 11 is to be held by the right hand, regions suitable for gripping are the sixteenth region S16 and the twenty-first region S21 of the main body 13.

When changing the vertical orientation and the horizontal orientation of the portable terminal 11, the main body 13 is rotated clockwise by 90 degrees, for example, in a state where the display 21 is viewed from the front. Then, the rear camera 15 disposed in the fifth region S5 in the back surface is disposed on a back surface side of an upper right portion of the display 21 that is in a vertical orientation. At this time, when the portable terminal 11 is to be held by the left hand, regions suitable for gripping are the twenty-first region S21 and the twenty-second region S22 of the main body 13. When the portable terminal 11 is to be held by the right hand, regions suitable for gripping are the first region S1 and the second region S2 of the main body 13.

Note that the vertical orientation is the orientation of the portable terminal 11 when the portable terminal 11 is in a portrait orientation. The horizontal orientation is the orientation of the portable terminal 11 when the portable terminal 11 is in a landscape orientation. In a case where the main body 13 has a square shape, since two edges orthogonal to each other have the same length, either edge may be treated as a vertical edge and a horizontal edge, that is, the vertical orientation and the horizontal orientation may be defined with either edge serving as a reference.

As described above, in the portable terminal 11, the rear camera 15 is disposed in the fifth region S5 and the operation button 19 is provided at the second merged region 55, and thus fingers do not interfere with the fifth region S5 and the second merged region 55 when the main body 13 is normally held with any of the left and right hands. In addition, even in a case where the vertical orientation and the horizontal orientation of the portable terminal 1 are switched, that is, the vertical orientation and the horizontal orientation of the portable terminal 1 are changed, and the main body 13 is normally held with any of the left and right hands, the fingers does not interfere with the fifth region S5 and the second merged region 55.

In this manner, the portable terminal 11 can be disposed such that the rear camera 15 comes close to an upper end of the main body 13 in any of the vertical orientation and the horizontal orientation of the main body 13. Further, the operation button 19 can be disposed at a position that is not hidden by a holding hand even when the main body 13 is held in any of the vertical orientation and the horizontal orientation and the main body 13 is held by either the right hand or the left hand.

As a result, with respect to the portable terminal 11, even when the portable terminal 11 is held in the vertical orientation and the horizontal orientation, the rear camera 15 and an operation portion such as the operation button 19 is not hidden by the holding hand, and a decrease in operability can be suppressed.

In addition, in the portable terminal 11, the battery 17 is accommodated in a range of the first merged region 53. The first merged region 53 is located like an island in a central portion surrounded by the first region S1, the second region S2, the third region S3, the fourth region S4, the fifth region S5, the sixth region S6, the tenth region S10, the eleventh region S11, the fifteenth region S15, the sixteenth region S16, the twentieth region S20, the twenty-first region S21, the twenty-second region S22, the twenty-third region S23, the twenty-fourth region S24, and the twenty-fifth region S25 along the outer peripheral surface of the main body 13. Further, the center of the battery 17 is within a range of the thirteenth region S13, which is a center of the first merged region 53.

Accordingly, a center of gravity of the battery 17 having a relatively large mass is disposed close to a center of gravity of the main body 13 excluding the battery 17 on the back surface. For this reason, as compared with a structure in which the battery 17 is attached in a one-sided manner near any edge on the back surface, a distance from the center of gravity of the battery 17 to the holding hand does not change greatly even when the portable terminal 11 is held in the vertical orientation and the horizontal orientation.

As a result, even when the portable terminal 11 is held in the vertical orientation and the horizontal orientation, the center of gravity of the battery 17 does not shift to a side that is not held, so that it is possible to reduce the burden on a user holding the main body 13 for a long period of time, and it is possible to suppress a decrease in operability.

Figure 9:
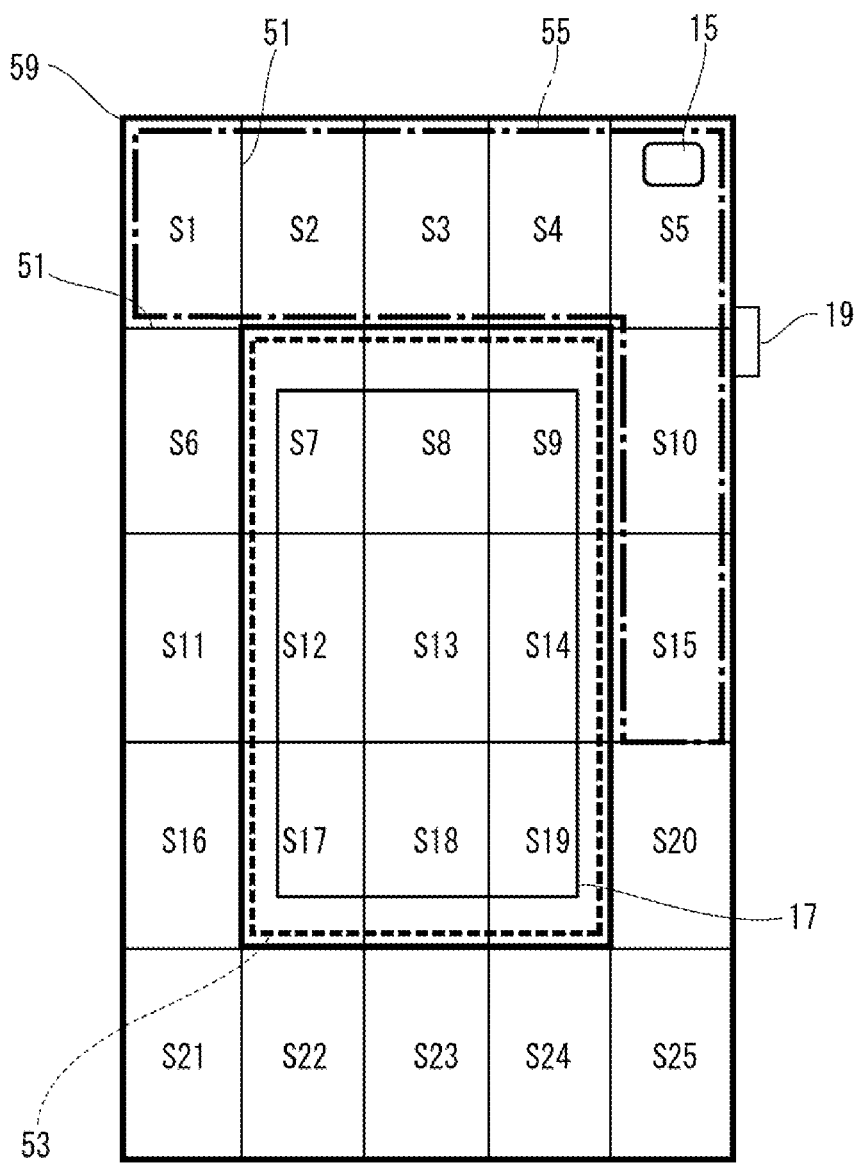
FIG. 9 is a schematic diagram illustrating another example in which the back surface of the main body is divided into regions of a matrix of 25 divisions.

FIG. 9 is a schematic diagram illustrating another example in which the back surface of the main body 13 is divided into regions of a matrix of 25 divisions.

As described above, the portable terminal 11 is generally formed in a rectangular shape in a plan view. Each of two edges of the main body 13, which are orthogonal to each other, is divided into five equal parts by the imaginary lines 51, and the portable terminal 11 is divided into matrix regions of 25 divisions. Any of the two edges is defined as an upper edge disposed on an upper side. When the main body 13 has a rectangular shape, one edge of the two edges is a long edge, and the other edge is a short edge. As illustrated in FIG. 3, when the long edge is defined as the upper edge, the main body 13 is in the horizontal orientation (landscape orientation). As illustrated in FIG. 9, when the short edge is defined as the upper edge, the main body 13 is in the vertical orientation (portrait orientation). That is, in FIG. 3, the reference orientation is the horizontal orientation, and in FIG. 9, the reference orientation is the vertical orientation.

When the regions of the first region S1 to the twenty-fifth region S25 are distributed by the arrangement pattern described above in two ways of the horizontal orientation and the vertical orientation, in an initial position before rotation, the rear camera 15 disposed in the fifth region S5 in the back surface, for example, is positioned on the back surface side of an upper left portion of the display 21 in a front view, even in the case of the horizontal orientation or the vertical orientation.

When the main body 13 in the horizontal orientation in which a long edge illustrated in FIG. 3 is defined as the upper edge is changed to the vertical orientation, the rear camera 15 disposed in the fifth region S5 in the back surface is positioned on the back surface side of an upper right portion of the display 21 in the vertical orientation. This position of the rear camera 15 is on a side opposite to the position of the rear camera 15 in the case of the main body 13 in the vertical orientation in which the short edge illustrated in FIG. 9 is defined as the upper edge, that is, the back surface side of an upper left portion of the display 21.

Further, when the main body 13 in the vertical orientation in which the short edge illustrated in FIG. 9 is defined as the upper edge is changed to the horizontal orientation, the rear camera 15 disposed in the fifth region S5 in the back surface is positioned on the back surface side of an upper right portion of the display 21 in the horizontal orientation. This position of the rear camera 15 is on a side opposite to the position of the rear camera 15 in the case of the main body 13 in the horizontal orientation in which the long edge illustrated in FIG. 3 is defined as the upper edge, that is, the back surface side of an upper left portion of the display 21.

That is, the portable terminal 11 has a configuration in which since "any of the two edges (the long edge and the short edge) is disposed on the upper side" and the matrix regions are defined, the rear camera 15 and the operation button 19 are disposed on either the left or right side of the upper edge even when the reference orientation is the horizontal orientation or the vertical orientation.

In the portable terminal 11, the main body 13 may have a rectangular shape in a plan view. The matrix regions may be defined from the first region S1 to the twenty-fifth region S25 in a state where two short edges of four edges of the back surface are positioned on the left and right of the main body 13.

In the portable terminal 11, the main body 13 is formed in a rectangular shape in a plan view. In the rectangular main body 13, the matrix regions are defined in a state where two short edges are positioned on the left and right of the main body 13 as illustrated in FIG. 3. That is, in the portable terminal 11, the matrix regions are defined (see FIG. 3) in the horizontal orientation in which the long edge is the upper edge.

In the portable terminal 11 in which the matrix regions are defined in the horizontal orientation, the rear camera 15 is disposed on the back surface side of the upper left portion of the display 21 in a front view in the case of the horizontal orientation. Further, in the portable terminal 11 in which the matrix regions are defined in the horizontal orientation, the rear camera 15 is disposed on the back surface side of the upper right portion of the display 21 in a front view in the case of the vertical orientation.

The portable terminal 11 may further include the circuit board 57. The circuit board 57 may be disposed along the periphery of the battery 17 when the portable terminal 11 is viewed through the back surface.

In the portable terminal 11, the circuit board 57 is disposed along the periphery of the battery 17. The battery 17 is disposed like an island at a central portion of the back surface. The circuit board 57 is provided so as to surround the periphery of the battery 17. With the matrix region serving as a reference, the circuit board 57 is provided in the rectangular frame-shaped region 59 in which the first region S1, the second region S2, the third region S3, the fourth region S4, the fifth region S5, the sixth region S6, the tenth region S10, the eleventh region S11, the fifteenth region S15, the sixteenth region S16, the twentieth region S20, the twenty-first region S21, the twenty-second region S22, the twenty-third region S23, the twenty-fourth region S24, and the twenty-fifth region S25 are merged. Since the circuit board 57 is disposed so as not to overlap the battery 17, a thickness of the portable terminal 11 at the time the battery is attached can be suppressed from increasing as compared with a case where the circuit board 57 and the battery 17 are stacked. In addition, it is possible to fix the battery 17 having a relatively large mass to the chassis 91 or the like of the main body 13 in a reliable and high-strength manner without causing the battery 17 to interfere with the circuit board 57 in the thickness direction.

In the portable terminal 11, the circuit board 57 may include the hole portion 61, and the battery 17 may be inserted into the hole portion 61.

In the portable terminal 11, the circuit board 57 has the hole portion 61. The battery 17 is inserted into the hole portion 61. Since the battery 17 is disposed at the central portion of the back surface, the hole portion 61 is also formed at the central portion of the back surface. That is, the circuit board 57 is formed in an annular shape having the quadrangular hole portion 61 at the central portion of the back surface. The annular circuit board 57 is disposed in a concentrated manner without wasting a space following the rectangular frame-shaped region 59. That is, in the portable terminal 11, the battery 17 and the circuit board 57 are shaped and disposed so as to allow concentrated three-dimensional arrangement, thereby making the entire portable terminal 11 compact.

Since the battery 17 can be disposed in a manner of passing through the hole portion 61 of the circuit board 57, the thickness of the portable terminal 11 at the time the battery is attached is further suppressed from increasing. In the portable terminal 11, since the battery 17 having a relatively large thickness can be disposed in a manner of being inserted into the hole portion 61 of the circuit board 57, for example, a thickness of the main body 13 can be reduced to substantially the same value as a thickness of the battery 17.

In the portable terminal 11, the pair of protruding portions 45 along a pair of parallel edges of the quadrangular battery 17 accommodated in the back surface may be detachably provided on the back surface of the main body 13.

In the portable terminal 11, the pair of protruding portions 45 may be detachably provided on the back surface of the main body 13. The pair of protruding portions 45 are disposed in parallel to each other along a pair of parallel edges of the quadrangular battery 17 accommodated in the back surface. As the battery 17, a standard type of a thin thickness and a large-capacity type having a thickness larger than that of the standard type may be provided. On the back surface to which the battery 17 of a standard type is attached, the pair of protruding portions 45 protrude more than the battery 17. Therefore, in the portable terminal 11 to which the battery 17 of a standard type is attached, the pair of protruding portions 45 protruding on the back surface can be used as a finger rest portion, and a holding property of the main body 13 can be improved. Further, on the back surface to which the battery 17 of a large-capacity type is attached, the battery 17 and the pair of protruding portions 45 have substantially the same height from the back surface. Accord-ingly, with the battery 17 of a large-capacity type, a level difference from the back surface is reduced, and it is possible to prevent another member from directly colliding with a battery side surface.

Further, the pair of protruding portions 45 can be detached from the back surface to expose connection terminals and the like provided inside the main body 13. Accordingly, the pair of protruding portions 45 can also function as a cover member that covers a connection terminal for a card reader such as a bar code reader or opens an optional area, for example.

Therefore, according to the portable terminal 11 of the present embodiment, even when the portable terminal 11 is held in any of the vertical orientation and the horizontal orientation, the burden applied to the user when the user holds the portable terminal 11 can be reduced, and a decrease in operability of the portable terminal 11 can be suppressed.

Although various embodiments are described above with reference to the drawings, it is needless to say that the present disclosure is not limited to such examples. It will be apparent to those skilled in the art that various changes and modifications may be conceived within the scope of the claims. It is also understood that the various changes and modifications belong to the technical scope of the present disclosure. Further, the respective constituent elements in the above-described embodiments may be optionally combined within a range not departing from the gist of the present invention.

For example, in the above-described embodiment, the upper lid portion 47 provided on the back surface of the main body 13 may be a protruding portion protruding more than the battery 17. In this case, the protruding portion serving as the upper lid portion 47 may be detachably provided. On the back surface to which the battery 17 of a standard type is attached, the protruding portion serving as the upper lid portion 47 protrude more than the battery 17. Therefore, in the portable terminal 11 to which the battery 17 of a standard type is attached, the protruding portion serving as the upper lid portion 47 protruding on the back surface can be used as a finger rest portion, and the holding property of the main body 13 can be improved. In addition, on the back surface to which the battery 17 of a large-capacity type is attached, the battery 17 and the protruding portion serving as the upper lid portion 47 may have substantially the same height from the back surface. Accordingly, with the battery 17 of a large-capacity type, a level difference from the back surface is reduced, and it is possible to prevent another member from directly colliding with the battery side surface.

In the above-described embodiment, a card reader or the like can be connected to an optional area of the back surface of the main body 13, but the present invention is not limited thereto. An electronic device other than the card reader may be connected to the optional area. The electronic device may include an external USB connector (USB receptacle) connectable to a USB cable or a USB plug connected to an external device. The electronic device may include an external LAN connector (LAN receptacle) connectable to a LAN cable or a LAN plug connected to an external device. Further, it is not that the upper lid portion 47 and the pair of protruding portions 45 are attached so as to freely expose the various functional components and the optional areas, an option (an electronic device such as the above-described card reader, a connector, or the like) may be directly attached to the upper lid portion 47 and the pair of protruding portions 45, or an option may be attached to positions of the upper lid portion 47 and the pair of protruding portions 45 in place of the upper lid portion 47 and the pair of protruding portions 45. In this case, the electronic device itself serving as an option is a protruding portion installed on the back surface of the main body 13.

Figure 10:
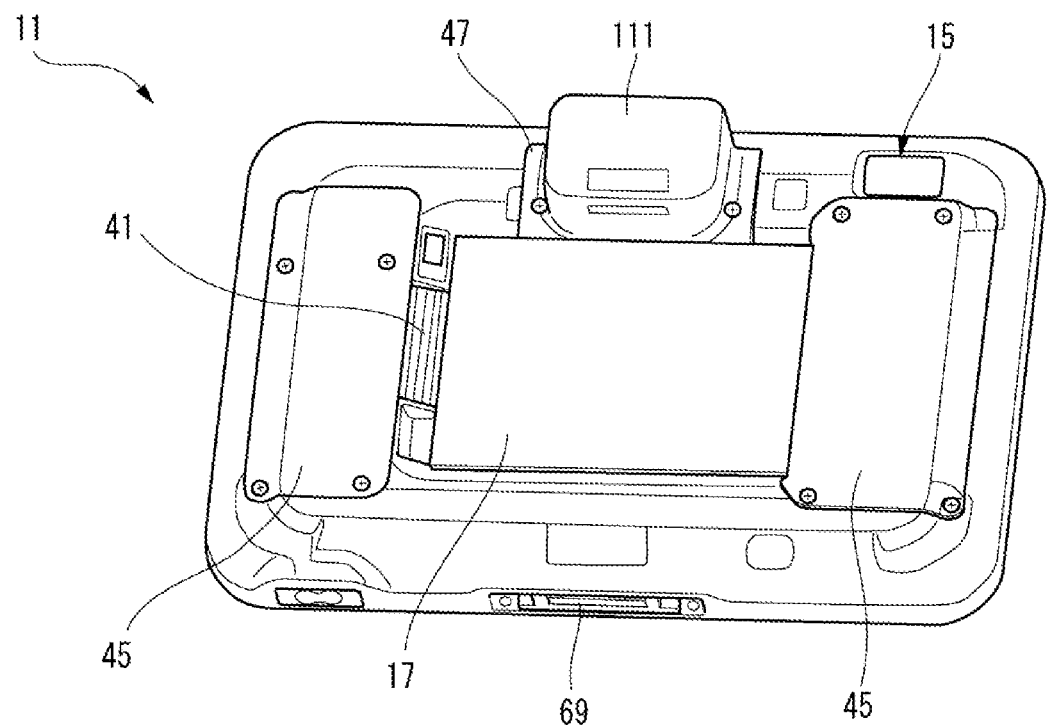
FIG. 10 is a diagram illustrating a first installation example of an option with respect to the main body.
Figure 11:
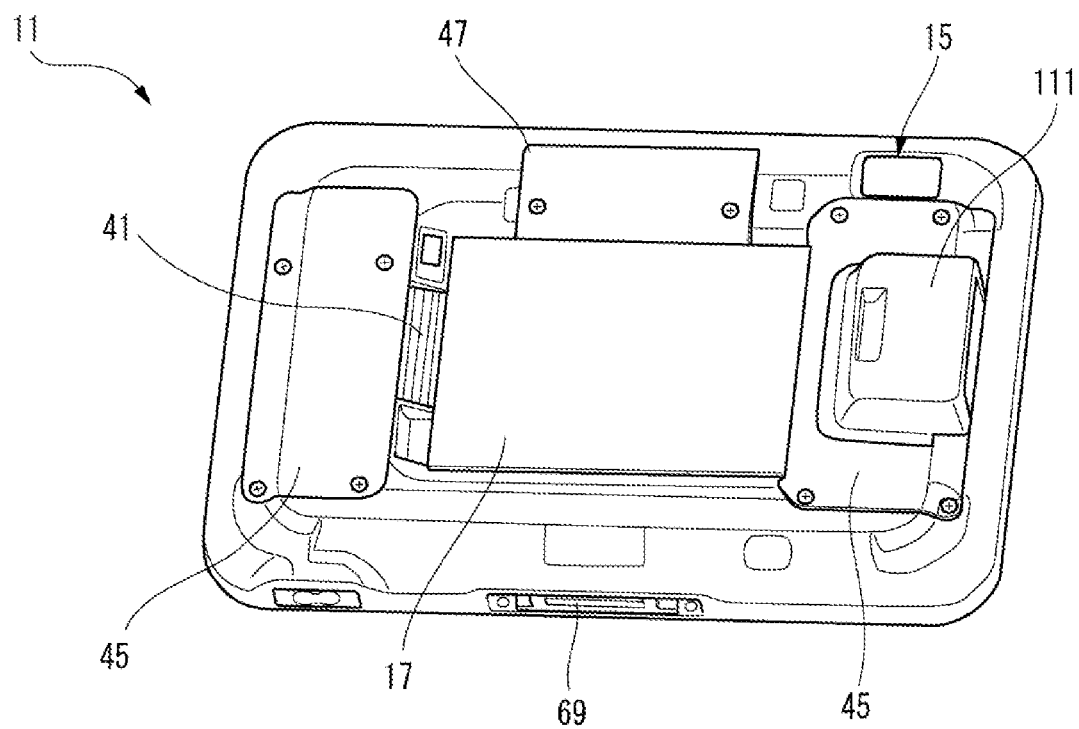
FIG. 11 is a diagram illustrating a second installation example of an option with respect to the main body.
Figure 12:
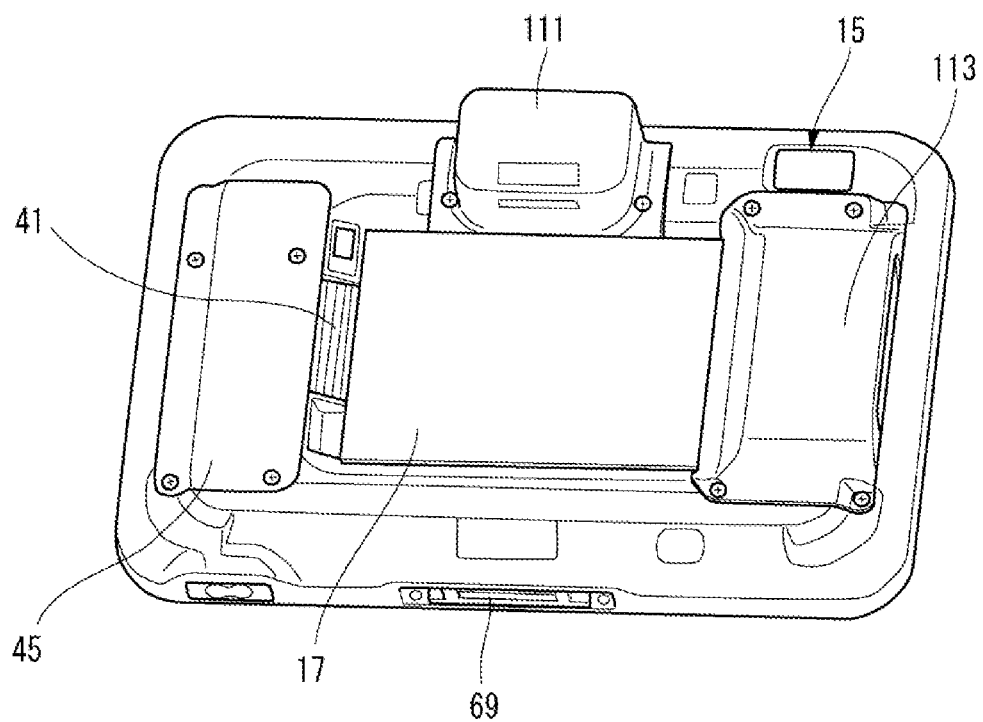
FIG. 12 is a diagram illustrating a third installation example of options with respect to the main body.
Figure 13:
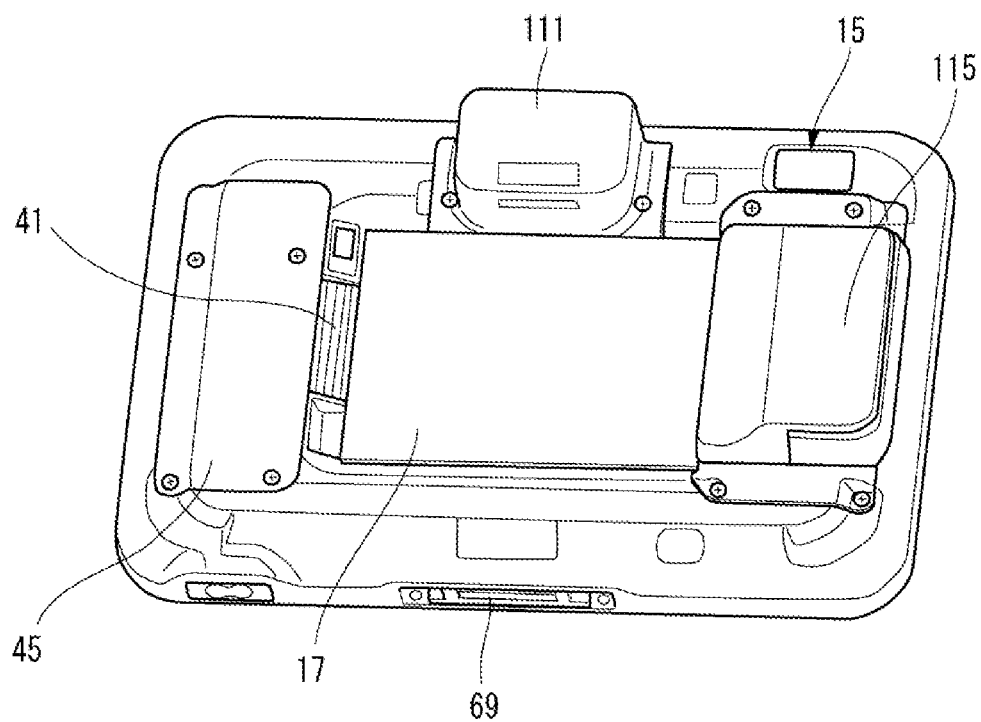
FIG. 13 is a diagram illustrating a fourth installation example of options with respect to the main body.
Figure 14:
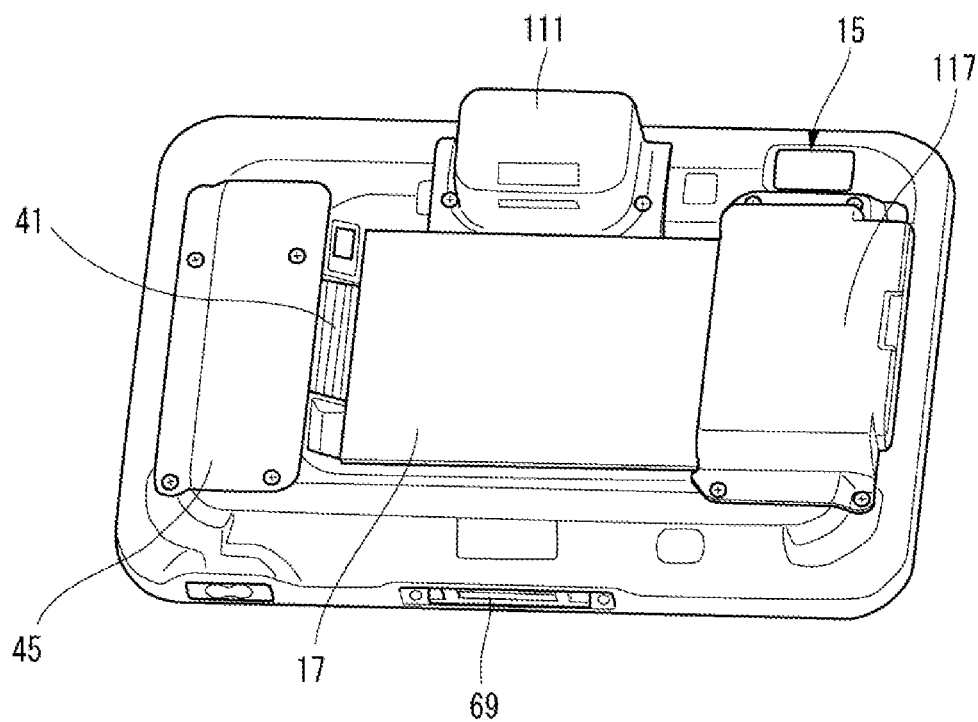
FIG. 14 is a diagram illustrating a fifth installation example of options with respect to the main body.
Figure 15:
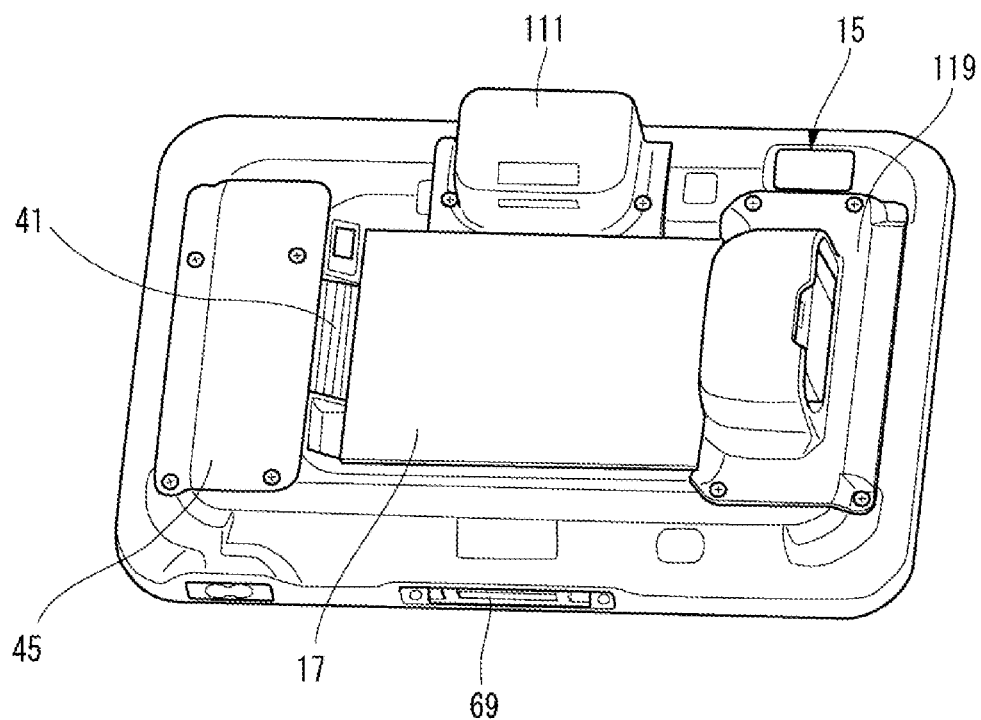
FIG. 15 is a diagram illustrating a sixth installation example of options with respect to the main body.

Installation examples of an option with respect to the back surface of the main body 13 will be supplemented. FIG. 10 is a diagram illustrating a first installation example of an option with respect to the main body 13. In FIG. 10, a bar code reader 111 is attached to the upper lid portion 47. FIG. 11 is a diagram illustrating a second installation example of an option with respect to the main body 13. In FIG. 11, the bar code reader 111 is attached to one of the pair of protruding portions 45. FIG. 12 is a diagram illustrating a third installation example of options with respect to the main body 13. In FIG. 12, the bar code reader 111 is attached to the upper lid portion 47, and a LAN connector 113 is attached to a position of one of the pair of protruding portions 45. FIG. 13 is a diagram illustrating a fourth installation example of options with respect to the main body 13. In FIG. 13, the bar code reader 111 is attached to a position of the upper lid portion 47, and a magnetic card reader 115 is attached to a position of one of the pair of protruding portions 45. FIG. 14 is a diagram illustrating a fifth installation example of options with respect to the main body 13. In FIG. 14, the bar code reader 111 is attached to a position of the upper lid portion 47, and a contact IC card reader 117 is attached to a position of one of the pair of protruding portions 45. FIG. 15 is a diagram illustrating a sixth installation example of options with respect to the main body 13. In FIG. 15, the bar code reader 111 is attached to a position of the upper lid portion 47, and a LAN connector 119 is attached to a position of one of the pair of protruding portions 45. The combination of the electronic devices installed at the positions of the upper lid portion 47 and the pair of protruding portions 45 is not limited to the combinations shown in FIGS. 10 to 16, and may be another combination.

Therefore, in the examples of FIGS. 10 to 15, a second protruding portion (for example, the upper lid portion 47 or an option) may be provided along an edge of the battery 17 on an upper-edge side of the main body 13, which is an edge extending substantially horizontally on the back surface of the main body 13, in other words, an edge substantially perpendicular to a pair of parallel edges extending in a substantially vertical direction at substantially the right and left sides. Accordingly, the portable terminal 11 can implement expansion of settlement processing and wired communication by using the electronic devices of various options, or can provide a finger rest portion in the case where the portable terminal 11 is held in the vertical orientation, for example.

This also applies to a first protruding portion (for example, the protruding portion 45 or an option) provided along a pair of parallel edges extending substantially in a left-right direction of the back surface of the main body 13. In this case, the portable terminal 11 can implement expansion of settlement processing and wired communication by using the electronic devices of various options, or can provide a finger rest portion in the case where the portable terminal 11 is held in the horizontal orientation, for example.

Further, the second protruding portion may be detachably provided with respect to the main body 13. Accordingly, when the expansion of settlement processing and wired communication using a USB or LAN is not necessary, a protruding portion serving as an option can be omitted in the portable terminal 11. Further, when it is less likely that the portable terminal 11 is held in the vertical orientation, the upper lid portion 47 does not have to be a protruding portion. Therefore, it is possible to achieve both addition of various functions to the portable terminal 11 and weight reduction of the portable terminal 11.

Although the present disclosure is described in detail with reference to specific embodiments, it is apparent to those skilled in the art that various changes and modifications can be made without departing from the spirit and scope of the present disclosure.

The present disclosure is useful for a portable terminal or the like that can reduce a burden applied when a user holds the portable terminal even when the portable terminal is held in any of a vertical orientation and a horizontal orientation, and can suppress a decrease in operability of the portable terminal.

REFERENCE SIGNS LIST 11 portable terminal
13 main body
15 rear camera
17 battery
19 operation button
21 display
45 protruding portion
51 imaginary line
53 first merged region
55 second merged region
57 circuit board
61 hole portion
S1 first region
S2 second region
S3 third region
S4 fourth region
S5 fifth region
S6 sixth region
S7 seventh region
S8 eighth region
S9 ninth region
S10 tenth region
S11 eleventh region
S12 twelfth region
S13 thirteenth region
S14 fourteenth region
S15 fifteenth region
S16 sixteenth region
S17 seventeenth region
S18 eighteenth region
S19 nineteenth region
S20 twentieth region
S21 twenty-first region
S22 twenty-second region
S23 twenty-third region
S24 twenty-fourth region
S25 twenty-fifth region

What is claimed is:
1. A portable terminal comprising:
a main body having a rectangular shape in a plan view and having a display on a front surface thereof;
a battery accommodated in the main body; and
a circuit board,
wherein in a state where two short edges among four edges of a back surface of the main body are positioned on a left side and a right side of the main body, when viewed from the back surface, the main body is divided into matrix regions, which are regions of a matrix of 25 divisions, by an imaginary line dividing each of two edges of the main body orthogonal to each other into five equal parts, in a state where any of the two edges is defined as an upper edge disposed on an upper side, five regions containing the upper edge are defined as a first region, a second region, a third region, a fourth region, and a fifth region in order from the left side, five regions below the first region, the second region, the third region, the fourth region, and the fifth region are defined as a sixth region, a seventh region, an eighth region, a ninth region, and a tenth region in order from the left side, five regions below the sixth region, the seventh region, the eighth region, the ninth region, and the tenth region are defined as an eleventh region, a twelfth region, a thirteenth region, a fourteenth region, and a fifteenth region in order from the left side, five regions below the eleventh region, the twelfth region, the thirteenth region, the fourteenth region, and the fifteenth region are defined as a sixteenth region, a seventeenth region, an eighteenth region, a nineteenth region, and a twentieth region in order from the left side, and five regions below the sixteenth region, the seventeenth region, the eighteenth region, the nineteenth region, and the twentieth region are defined as a twenty-first region, a twenty-second region, a twenty-third region, a twenty-fourth region, and a twenty-fifth region in order from the left side, wherein the battery is accommodated in a first merged region in which the seventh region to the ninth region, the twelfth region to the fourteenth region, and the seventeenth region to the nineteenth region are merged, area of a front surface of the battery in a plan view is equal to or less than 9/25 of area of a back surface of the portable terminal in a plan view, and a length of a side surface of the battery is equal to or less than 3/5 of a length of a side surface of the portable terminal, wherein when the portable terminal is viewed from the back surface, a center of the battery is in the thirteenth region, wherein the circuit board is disposed along a periphery of the battery when the portable terminal is seen through the back surface, and wherein an optional area is provided in any of a third merged region, in which the second region to the fourth region are merged, and a fourth merged region, in which the tenth region, the fifteenth region, and the twentieth region are merged, and an optional component is detachably attached to the optional area.

2. The portable terminal according to claim 1, wherein the optional area is provided in both the third merged region and the fourth merged region.

3. The portable terminal according to claim 1, wherein the circuit board has a hole portion, and wherein the battery is disposed so as to be inserted into the hole portion.

4. The portable terminal according to claim 1, wherein a pair of first protruding portions along a pair of parallel edges of the rectangular battery accommodated in the back surface are provided on the back surface of the main body.

5. The portable terminal according to claim 4, wherein a second protruding portion is provided along an edge of the battery on a side of the upper edge of the main body, the edge being an edge substantially perpendicular to the pair of parallel edges.

6. The portable terminal according to claim 4, wherein the first protruding portion is detachably provided.

7. The portable terminal according to claim 5, wherein the second protruding portion is detachably provided.

* * * * *